(12) United States Patent
Liu et al.

(10) Patent No.: US 11,886,065 B2
(45) Date of Patent: Jan. 30, 2024

(54) DISPLAY PANEL, TEMPERATURE COMPENSATION METHOD THEREOF AND DISPLAY DEVICE

(71) Applicants: Beihai HKC Optoelectronics Technology Co., Ltd., Beihai (CN); CHONGQING HKC OPTOELECTRONICS TECHNOLOGY CO., LTD., Chongqing (CN)

(72) Inventors: Kaijun Liu, Chongqing (CN); Yu Lien Chou, Chongqing (CN); Je-Hao Hsu, Chongqing (CN)

(73) Assignees: BEIHAI HKC OPTOELECTRONICS TECHNOLOGY CO., LTD., Beihai (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 220 days.

(21) Appl. No.: 17/427,742

(22) PCT Filed: Jun. 10, 2020

(86) PCT No.: PCT/CN2020/095407
§ 371 (c)(1),
(2) Date: Aug. 2, 2021

(87) PCT Pub. No.: WO2020/249016
PCT Pub. Date: Dec. 17, 2020

(65) Prior Publication Data
US 2022/0107527 A1 Apr. 7, 2022

(30) Foreign Application Priority Data

Jun. 10, 2019 (CN) .......................... 201910496477.6

(51) Int. Cl.
*G02F 1/1333* (2006.01)
*G09G 3/36* (2006.01)
*G02F 1/1368* (2006.01)

(52) U.S. Cl.
CPC ..... *G02F 1/133382* (2013.01); *G09G 3/3648* (2013.01); *G02F 1/1368* (2013.01);
(Continued)

(58) Field of Classification Search
CPC ............ G02F 1/133382; G02F 1/1368; G09G 3/3648; G09G 2310/08; G09G 2320/041; G09G 2330/045
See application file for complete search history.

(56) References Cited

U.S. PATENT DOCUMENTS 6,414,740 B1 7/2002 Hosoyamada
9,455,277 B2 9/2016 Zhaokeng et al.
(Continued)

FOREIGN PATENT DOCUMENTS

CN 103852924 A 6/2014
CN 104597645 A 5/2015
(Continued)

OTHER PUBLICATIONS

International Search Report for International Application No. PCT/CN2020/095407 dated Oct. 28, 2020, 5 pages.
(Continued)

*Primary Examiner* — Paisley L Wilson
(74) *Attorney, Agent, or Firm* — Franklin & Associates International Inc; Matthew F. Lambrinos (57) ABSTRACT

The present disclosure relates to a display panel, a temperature compensation method thereof and a display device. The display panel includes: a first substrate; a second substrate; a liquid crystal layer; a plurality of temperature sensors; a plurality of heaters; an electrical signal supply circuit; a
(Continued)

processor; and a controller. The display device includes a driving circuit and the display panel. The driving circuit includes a source driving circuit, a gate driving circuit, and a timing controller.

20 Claims, 6 Drawing Sheets

(52) U.S. Cl.
CPC ... *G09G 2310/08* (2013.01); *G09G 2320/041* (2013.01); *G09G 2330/045* (2013.01)

(56) References Cited

U.S. PATENT DOCUMENTS

| | | | |
|---|---|---|---|
| 9,964,792 B2 | 5/2018 | Min et al. | |
| 2007/0236441 A1 | 10/2007 | Zhang et al. | |
| 2011/0199401 A1* | 8/2011 | Fujiwara | G09G 3/3426 |
| | | | 345/102 |
| 2012/0154706 A1* | 6/2012 | Cho | G09G 3/3648 |
| | | | 349/72 |
| 2016/0126257 A1 | 5/2016 | Cao et al. | |
| 2018/0090103 A1* | 3/2018 | Zhang | G01K 13/00 |
| 2020/0073168 A1* | 3/2020 | Zhao | G02F 1/136286 |

FOREIGN PATENT DOCUMENTS

| | | |
|---|---|---|
| CN | 105182585 A | 12/2015 |
| CN | 107065268 A | 8/2017 |
| CN | 107092117 A | 8/2017 |
| CN | 110221468 A | 9/2019 |
| JP | 2000338518 A | 12/2000 |
| JP | 2003329999 A | 11/2003 |
| JP | 2016075874 A | 5/2016 |
| KR | 20100120272 A | 11/2010 |

OTHER PUBLICATIONS

Chinese Office Action for corresponding Chinese Application No. 201910496477.6 dated Feb. 3, 2021, 9 pages.

* cited by examiner

DISPLAY PANEL, TEMPERATURE COMPENSATION METHOD THEREOF AND DISPLAY DEVICE

CROSS REFERENCE TO RELATED APPLICATIONS

This is a U.S. National Stage application of, and claims priority to, PCT/CN2020/095407, filed Jun. 10, 2020, which further claims priority to Chinese Patent Application No. 2019104964776, filed Jun. 10, 2019, the disclosures of which are incorporated herein by reference in their entirety.

TECHNICAL FIELD

The present disclosure relates to the field of display technologies, more particularly, to a display panel, a temperature compensation method thereof and a display device.

BACKGROUND

With the acceleration of the information age, display devices play a very important part during development of information technologies, and display screens of all kinds of instruments provide a lot of information for people's daily life and work. Without displays, there would be no rapid development of today's information technologies. The displays integrate electronics, communication and information processing technologies, which is regarded as another important development opportunity in the electronics industry after microelectronics and computers in the $20^{th}$ century. Thin film transistor-liquid crystal displays (TFT-LCD) have been widely used in our life and work due to characteristics such as good brightness, high contrast, strong sense of layering, bright color, simple production and stable performance.

An LCD used in wild and high-cold areas is generally required to be capable of operating normally at low temperatures. However, when the temperature is too low, a threshold voltage increases, and a response speed of the LCD slows down until crystallization. At present, wide-temperature liquid crystal materials have been developed in China, but the improvement of low-temperature display properties of the wide-temperature liquid crystal materials is very limited, and a liquid crystal viscosity coefficient increases sharply under ultra-low temperature conditions, and the response speed of the device is obviously slow. Therefore, to ensure the normal operation of the LCD under low temperature conditions is of primary importance. Although an LCD with a heating system has been produced, due to the manufacturing process, the heating system is easy to cause non-uniform temperatures in different positions of the display, leading to problems such as display Mura.

SUMMARY

Based on this, it is necessary to provide a display panel, a temperature compensation method thereof and a display device for how to overcome the problem that a heating system is easy to cause non-uniform temperatures in different positions of a display.

According to embodiments of the present disclosure, a display panel is provided, including:
  a first substrate;
  a second substrate;
  a liquid crystal layer sandwiched between the first substrate and the second substrate;
  a plurality of temperature sensors disposed in the first substrate, wherein each temperature sensor includes a source, a drain and a gate, and the drain and the gate of each temperature sensor are electrically connected;
  a plurality of heaters respectively arranged on one side of the first substrate and the second substrate away from the liquid crystal layer;
  an electrical signal supply circuit configured to input an electrical signal to the drain of each temperature sensor;
  a processor connected to the source of each temperature sensor, and configured to determine whether temperature data acquired by each temperature sensor is below a preset temperature; and
  a controller connected to the processor and the heaters respectively, and configured to control the heaters to perform heating when the temperature data is below the preset temperature.

In one embodiment, the plurality of temperature sensors are arranged in an array in the first substrate.

In one embodiment, the temperature sensors in each row of the array forms a temperature sensing region.

In one embodiment, the temperature sensors in each column of the array forms a temperature sensing region.

In one embodiment, the heater includes a plurality of parallel heating strips made of a transparent conductive material.

In one embodiment, the heating strips are connected in series or in parallel.

In one embodiment, the heating strips in the same temperature sensing region are connected in series, and the heating strips in different temperature sensing regions are connected in parallel.

In one embodiment, a preset number of heating strips are provided in each temperature sensing region.

According to the embodiments of the present disclosure, a temperature compensation method of the display panel is further provided, the display panel being the display panel as described in any one of the above embodiments; and the method including:
  acquiring temperature data collected by the temperature sensors at different positions of the display panel;
  determining, by the processor, whether the temperature data is below the preset temperature; and
  controlling, by the controller, the heaters to perform heating in response to the temperature data being below the preset temperature.

In one embodiment, the temperature sensors are divided into a plurality of sensor sensing regions in the display panel; and the method further includes:
  acquiring temperature data collected by the temperature sensors in a first temperature sensing region; and
  acquiring an average value of the temperature data, and taking the average value as a reference temperature.

In one embodiment, the heater includes a plurality of parallel heating strips, and a preset number of heating strips are provided in each temperature sensing region; and the method further includes:
  acquiring temperature data collected by the temperature sensors in a second temperature sensing region;
  determining whether the temperature data in the second temperature sensing region is below the reference temperature;
  marking the temperature data below the reference temperature as first abnormal temperature data; and controlling the heating strips in the second temperature sensing region to perform heating in response to the existence of the first abnormal temperature data in the second temperature sensing region.

In one embodiment, each temperature sensing region includes one temperature sensor, and a preset number of heating strips are provided in each temperature sensing region; and the method further includes:

acquiring temperature data in each temperature sensing region;

determining whether the temperature data is below a minimum temperature at which the display panel is capable of operating normally;

marking the temperature data below the minimum temperature as second abnormal temperature data; and controlling the heating strips in a temperature sensing region to perform heating in response to the temperature data in the temperature sensing region being the second abnormal temperature data.

A display device includes a driving circuit and a display panel, wherein the display panel is the display panel described above.

BRIEF DESCRIPTION OF THE DRAWINGS

In order to more clearly illustrate the technical solutions in the embodiments of the present disclosure, the accompanying drawings needing to be used in the description of the embodiments will be briefly introduced below. It is appreciated that, the accompanying drawings in the following description are only some embodiments of the present disclosure, and other drawings can be obtained by those of ordinary skill in the art from the provided drawings without creative work.

DETAILED DESCRIPTION OF THE EMBODIMENTS

In the display panel, the temperature compensation method thereof and the display device according to the present disclosure, a plurality of temperature sensors manufactured by the same process as a first substrate are arranged on one side of the first substrate of the display panel, so that a separate temperature sensor does not need to be additionally provided in the present disclosure, which can reduce the production cost. Each temperature sensor includes a source, a drain and a gate and is obtained by electrically connecting the drain and the gate, which can better adapt to the manufacturing process of the display panel, reduce circuit complexity, and reduce the cost compared with an existing temperature sensor (a thermocouple, a thermistor, or the like). Further, temperature sensors and heaters are provided at different positions, an electrical signal supply circuit provides an electrical signal through the drain of each temperature sensor, and a processor processes and determines temperature data, and controls, through a controller, the heaters to heat the display panel when the temperature data is below a preset temperature, so that the temperature at each position of the display panel is maintained in a more uniform and normal operation state, which overcomes the defect that the display panel cannot display normally or has Mura due to a too low ambient temperature.

To facilitate understanding of the present disclosure, a more comprehensive description of the present disclosure will be given below with reference to the relevant drawings. Preferred embodiments of the present disclosure are given in the drawings. However, the present disclosure may be implemented in many different forms but is not limited to the embodiments described herein. Rather, these embodiments are provided to make the contents disclosed in the present disclosure more fully understood.

It should be noted that when one element is referred to as "attached to" another element, it may be directly disposed on the other element or an intermediate element may exist. When one element is considered to be "connected to" another element, it may be directly connected to the other element or an intermediate element may co-exist. The terms "vertical", "horizontal", "left", "right" and similar expressions used herein are for illustrative purposes only, and do not represent unique embodiments.

Unless defined otherwise, all technical and scientific terms used herein have the same meanings as are commonly understood by those skilled in the art. The terms used herein in the specification of the present disclosure are for the purpose of describing specific embodiments only but not intended to limit the present disclosure.

Figure 1:
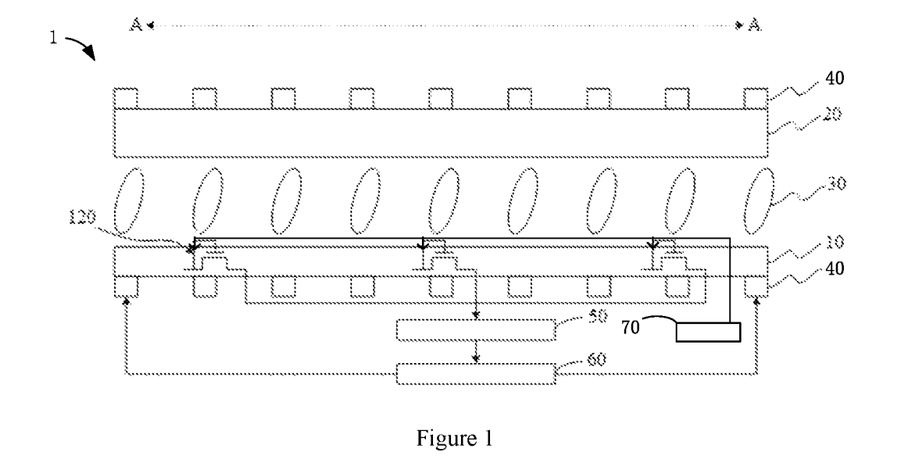
FIG. 1 is a sectional view of a display panel according to an embodiment.

Referring to FIG. 1, it is a sectional view of a display panel 1 according to an embodiment. The display panel 1 may include a first substrate 10, a second substrate 20, and a liquid crystal layer 30 sandwiched between the first substrate 10 and the second substrate 20. The first substrate 10 may be a Thin Film Transistor (TFT) substrate, and correspondingly, the second substrate 20 may be a color filter substrate. The display panel 1 may further include a plurality of temperature sensors (only one temperature sensor 120 is marked in FIG. 1; for ease of description, subsequent temperature sensors are all described by taking the temperature sensor 120 as an example), a plurality of heaters 40, an electrical signal supply circuit 70, a processor 50 and a controller 60. The plurality of temperature sensors 120 are disposed in the first substrate 10, and are manufactured by the same process as the first substrate 10. In other words, when the first substrate 10 is manufactured by lithography, deposition and other processes, the temperature sensor 120 is also manufactured by lithography, deposition and other processes. Since the first substrate 10 is a TFT substrate, when the TFT substrate is formed by lithography, deposition and other processes, a device for sensing temperatures is also formed. So, a separate temperature sensor does not need to be additionally provided in the present disclosure, which can better adapt to the manufacturing process of the display panel, thereby reducing circuit complexity and reducing the cost. Moreover, the device may include a source, a drain and a gate. In the present disclosure, the temperature sensor 120 in the present disclosure is formed by electrically connecting the drain and the gate of each device (which can be implemented by a via process). The plurality of temperature sensors 120 are arranged at different positions in the first substrate 10 of the display panel 1. The electrical signal supply circuit 70 is configured to input an electrical signal from the drain of each temperature sensor 120. The plurality of heaters 40 are respectively arranged on one side of the first substrate 10 and the second substrate 20 away from the liquid crystal layer 30, that is, an outer side of the first substrate 10 and an outer side of the second substrate 20. The heaters 40 are arranged on an outer side of the first substrate 10 and an outer side of the second substrate 20, so that the heating is more uniform. The processor 50 is connected to the source of each temperature sensor 120, and configured to determine whether temperature data acquired by each temperature sensor is below a preset temperature. The controller 60 is connected to the processor 50 and the heaters 40 respectively, and the controller 60 is configured to control the heaters 40 to perform heating when the temperature data is below the preset temperature.

Since a base of the TFT substrate in the display panel 1 is generally a glass substrate and the glass substrate is a good heat conductor with a small specific heat, it is easy to transfer heat to pixels when the heaters 40 are arranged on an outer side of the TFT substrate for heating, so as to heat the liquid crystal layer 30 in the display panel 1. Moreover, a liquid crystal box is very thin, generally only about 5 microns. The temperature of the liquid crystal layer 30 is kept consistent with that of the glass substrate provided that the temperature of the glass reaches a required temperature, so it is easy to improve the temperature of the glass substrate by heating. The display panel of such a structure greatly expands the range of use of the display.

In the above display panel 1, the temperature sensors 120 and the heaters 40 are arranged at different positions, so that the temperature at each position of the display panel 1 can be maintained in a more uniform and normal operation state.

Figure 2:
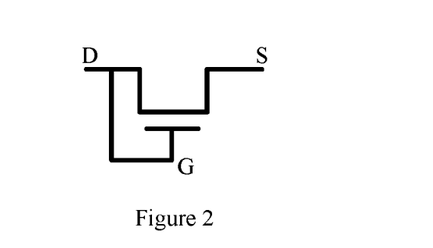
FIG. 2 is a schematic planar diagram of a temperature sensor according to an embodiment.
Figure 3:
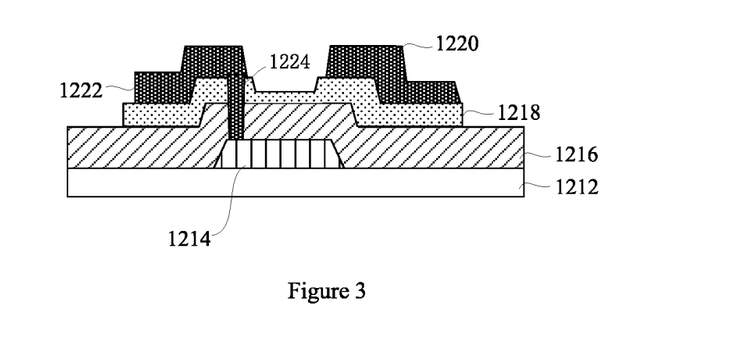
FIG. 3 is a schematic structural diagram of a temperature sensor according to another embodiment.

Further, referring to FIG. 2 and FIG. 3, the temperature sensor 120 is described briefly, and the temperature measurement principle of the temperature sensor 120 is explained. FIG. 2 is a schematic planar diagram of the temperature sensor 120, and FIG. 3 is a schematic structural diagram of the temperature sensor 120. In FIG. 3, the temperature sensor 120 may include a substrate 1212, a gate 1214, a gate insulation layer 1216, an active layer 1218, a source 1220 and a drain 1222. The substrate 1212 in the temperature sensor 120 may be the base in the first substrate 10 (TFT substrate). On this basis, a TFT is formed by conventional deposition, lithography and other processes. The TFT also includes a gate 1214, a source 1220 and a drain 1222. Different from the traditional TFT, in the present disclosure, a via 1224 running through the gate insulation layer 1216 and the active layer 1218 is provided above the gate 1214, and then the drain 1222 is connected to the gate 1214 through the via 1224, so as to form a temperature sensing device (temperature sensor 120) similar to a diode. When the electrical signal supply circuit 70 provides an electrical signal through the drain 1222 of each temperature sensor 120, the temperature sensor 120 activates a temperature sensing function. As the temperature around the temperature sensor 120 decreases, the binding between holes and electron pairs in the active layer 1218 slows down, and the concentration of a carrier also decreases, so that a current through the temperature sensor 120 decreases, and the corresponding resistance may increase. If temperature values under a plurality of different resistances are plotted in a two-dimensional coordinate system and points are connected by a smooth curve, a curvilinear relationship between temperature and resistance can be obtained, and thus the temperature around the temperature sensor 120 can be detected according to the curve by detecting the magnitude of resistance.

For a display used in wild and high-cold areas, the operating temperature of each module is generally required to be between −45° C. and 80° C. In the present disclosure, in order to enable each module of the display panel 1 to operate normally, the preset temperature can be set to −20° C. Further, in the present disclosure, the preset temperature is set to −10° C., that is, when a temperature value detected by the temperature sensor 120 is below or equal to −10° C., the heater 40 can be enabled to heat the display panel 1, so as to ensure the normal operation of each module of the display panel 1. For ease of description, the preset temperature of −10° C. is taken as an example for illustration in the following embodiments of the present disclosure.

In one embodiment, each temperature sensor 120 is divided into a plurality of sensor sensing regions in the display panel 1. In order to make detection results of the temperature sensors 120 more accurate and easy to control, the plurality of temperature sensors 120 may be divided in the display panel 1. Further, the division may be performed in a row direction and/or a column direction. That is, the temperature sensor 120 may be divided in a row direction or in a column direction, or divided in a row direction and a column direction. Further, each temperature sensor 120 is distributed in array in display panel 1; please refer to FIG. 4. As an example, in the present disclosure, a 3×3 array is employed for the temperature sensor 120, and the temperature sensor 120 is divided by taking the row direction as a division direction. Three temperature sensors 120 in each row constitute a temperature sensing region, namely, a temperature sensing region A1. Three temperature sensors 120 are provided in the region A1. The three temperature sensors 120 are equally spaced. Moreover, corresponding heaters 40 are further provided in the temperature sensing region A1. The heaters 40 and the temperature sensors 120 may be controlled by the controller 60. Similarly, when the temperature sensor 120 is divided in the column direction, the three temperature sensors 120 in each column constitute a temperature sensing region, namely, a temperature sensing region A2. Corresponding heaters 40 are also provided in the temperature sensing region A2. The temperature sensors 120 and the heaters 40 are divided into regions and controlled, which is conducive to targeted detection and adjustment of different regions of the display panel 1, and at the same time, can also avoid heating unnecessary regions, thus saving the cost.

Figure 4:
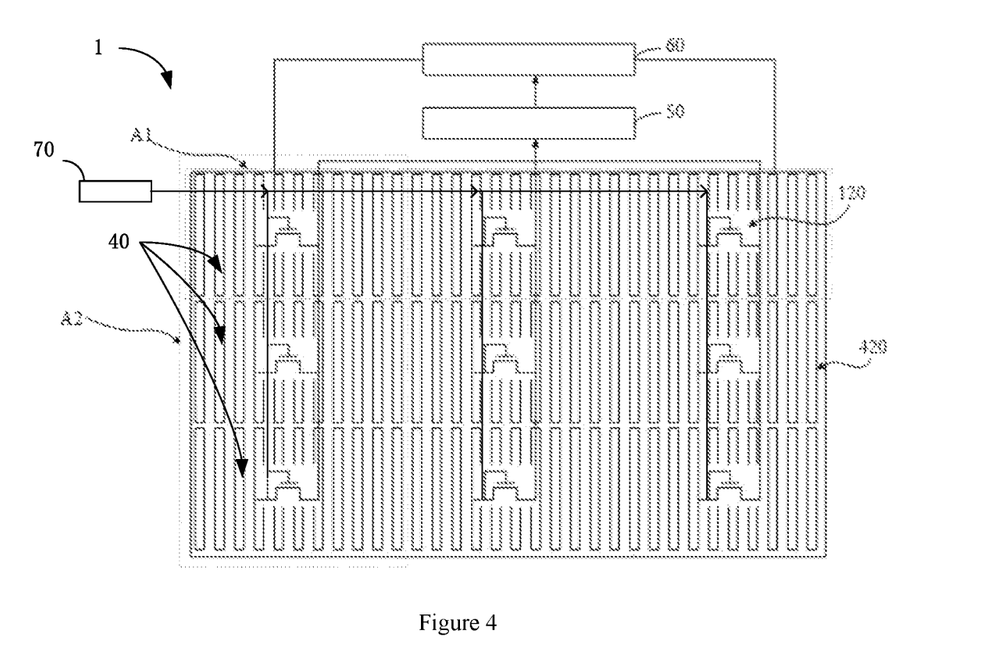
FIG. 4 is a schematic structural diagram of a display panel according to an embodiment.

In one embodiment, referring to FIG. 4, the heater 40 may include a plurality of parallel heating strips 420 made of a transparent conductive material. The heating strips 420 may be made of, for example, Indium tin oxide (ITO), or other transparent conductive materials such as Indium Zinc oxide (IZO). The temperature sensor is divided in a row and/or column direction, and corresponding heating strips are arranged in the divided regions, which can better adapt to the display panel, so as to make measurement and heating effects better. Further, the heating strips 420 are connected in series or in parallel. As an example, the heating strips 420 in the same temperature sensing region are connected in series, and the heating strips 420 in different temperature sensing regions are connected in parallel, so that the heating strips 420 in the same temperature sensing region can be controlled simultaneously, and the heating strips in different temperature sensing regions can be controlled separately.

Further, a preset number of heating strips 420 are provided in each temperature sensing region. For example, referring to FIG. 4, thirty heating strips 420 are provided in the temperature sensing region A1. Ten heating strips 420 are provided in a region covered by each temperature sensor 120. Such setting enables measurement and heating effects to be better.

Figure 6:
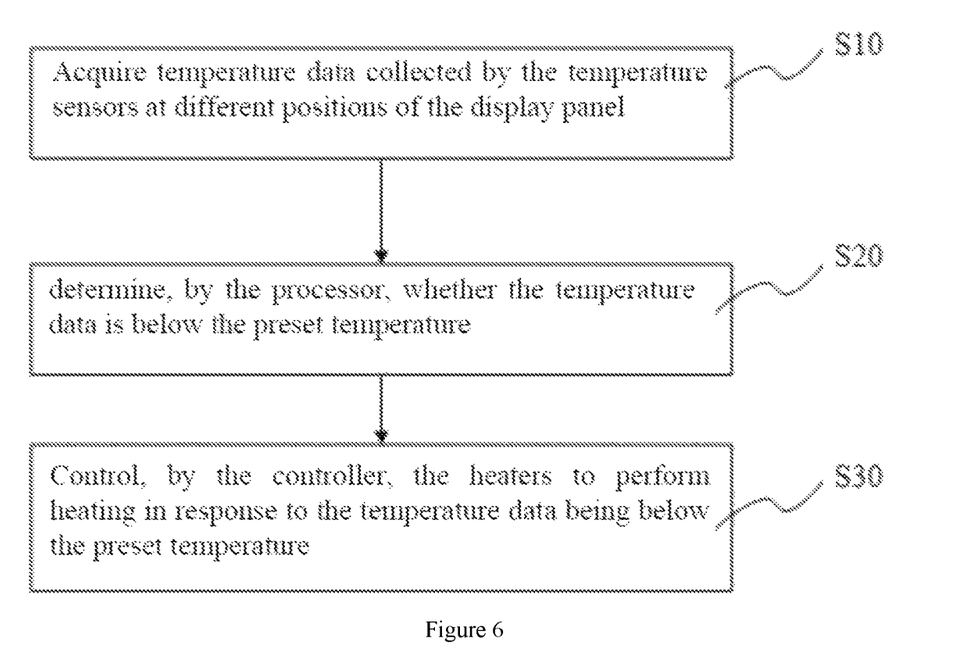
FIG. 6 is a schematic flow chart of a temperature compensation method of a display panel according to an embodiment.

Referring to FIG. 6, the present disclosure further provides a schematic flow chart of a temperature compensation method of a display panel. The temperature compensation method is based on a display panel. The display panel is the display panel as described in any one of the above embodiments. The method includes steps S10 to S30.

In step S10, temperature data collected by the temperature sensors at different positions of the display panel is acquired.

In step S20, it is determined, by the processor, whether the temperature data is below the preset temperature.

In step S30, the controller controls the heaters to perform heating in response to the temperature data being below the preset temperature.

Referring to FIG. 4 together, the temperature sensors 120 are arranged in the display panel 1 and disposed at different positions of the display panel 1. The plurality of temperature sensors 120 are distributed in an array. In the present disclosure, as an example, the temperature sensors 120 are arranged in 3×3, that is, three rows and three columns. The electrical signal supply circuit 70 provides an electrical signal for the drain of each temperature sensor 120, enabling each temperature sensor 120 to turn on a temperature sensing function. Then, temperature data collected by each temperature sensor 120 is acquired. The processor 50 processes the collected temperature data and determines whether the processed temperature data is below the preset temperature. According to the above description, the preset temperature is −10° C., that is, it is necessary to determine whether the processed temperature data is below or equal to −10° C. During temperature measurement, the precision of a temperature value measured generally does not need to be particularly high. Therefore, a temperature sensor formed by connecting a drain and a gate of an ordinary TFT is fully capable of the task of temperature measurement. If a judgment result is that actual measured temperature data is below the preset temperature, the controller 60 sends a control instruction to the corresponding heater 40 to start a heating function and heat the display panel 1 to ensure the normal operation of each module of the display panel 1.

According to the temperature compensation method of a display panel, temperature data at different positions of the display panel 1 is acquired, and it is determined whether the temperature data is below a preset temperature, so that the temperature at each position of the display panel 1 can be maintained in a more uniform and normal operation state.

Figure 7:
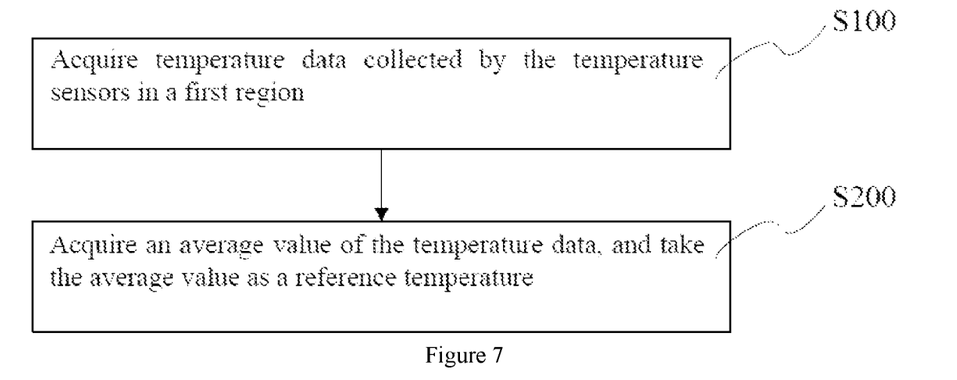
FIG. 7 is a schematic flow chart of a temperature compensation method of a display panel according to another embodiment.

In one embodiment, the temperature sensors 120 are divided into a plurality of sensor sensing regions in a row direction or a column direction in the display panel 1. The temperature compensation method of the display panel may further include steps S100 to S200.

In step S100, temperature data collected by the temperature sensors in a first temperature sensing region is acquired.

Temperature data collected by the temperature sensors in a first temperature sensing region is acquired. A region covered by all the temperature sensors 120 can be taken as the first temperature sensing region. That is, temperature data collected by each temperature sensor 120 in the entire display panel region is acquired. The temperature data may be temperature data of the display panel in a non-high-cold and low-temperature state, or the temperature data acquired when the display panel is just powered on.

In step S200, an average value of the temperature data is acquired, and the average value is taken as a reference temperature.

An average value of the temperature data is acquired, and the average value is taken as a reference temperature. After the temperature of each temperature sensor is acquired, an average value of the temperatures of each temperature sensor is acquired. The average value being taken as a reference temperature can reduce an error and make subsequent reference to the reference temperature more accurate. The reference temperature herein is different from the above preset temperature, which may be higher than the preset temperature. The temperature data of the display panel in a non-high-cold and low-temperature state being taken as a reference temperature can further ensure the normal operation of each module of the display panel. The first temperature sensing region may also be a region of the display panel, which is not further limited in the present disclosure.

Figure 8:
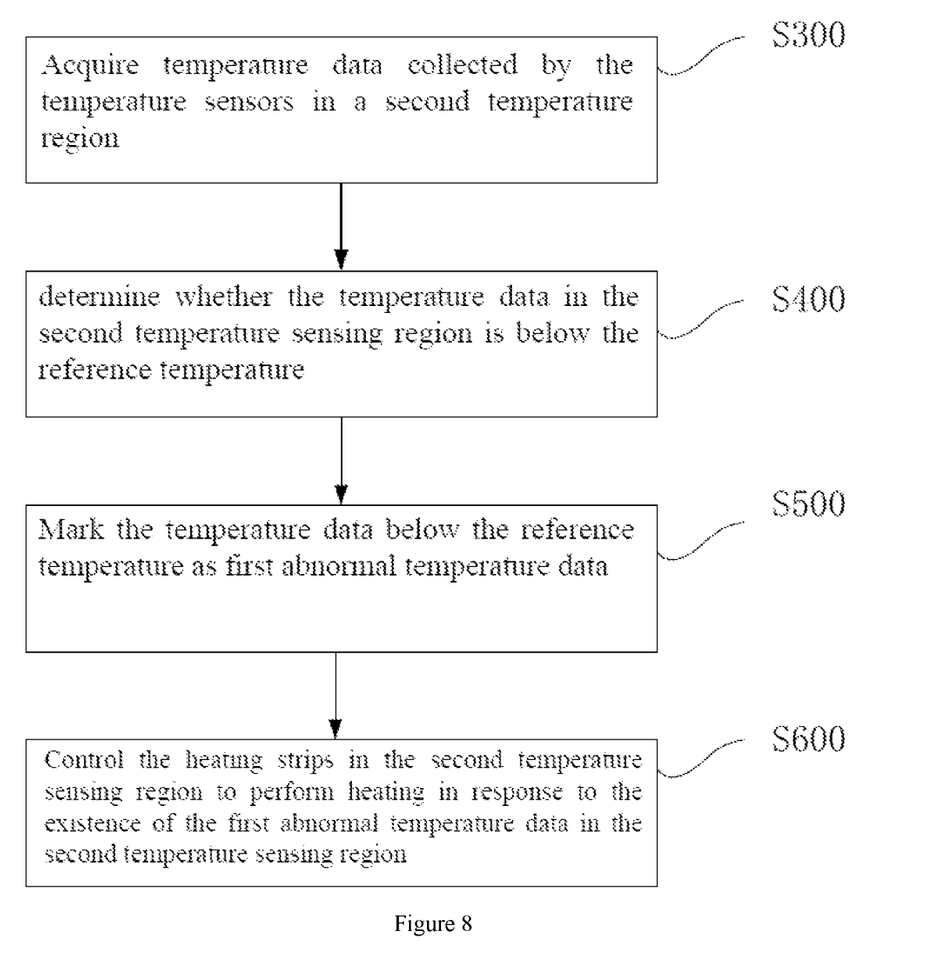
FIG. 8 is a schematic flow chart of a temperature compensation method of a display panel according to a further embodiment.

In one embodiment, the heater may include a plurality of parallel heating strips 420, and a preset number of heating strips 420 are provided in each temperature sensing region. The temperature compensation method of the display panel may further include steps S300 to S600.

In step S300, temperature data collected by the temperature sensors in a second temperature sensing region is acquired.

In step S400, it is determined whether the temperature data in the second temperature sensing region is below the reference temperature.

In step S500, the temperature data below the reference temperature is marked as first abnormal temperature data.

In step S600, the heating strips in the second temperature sensing region are controlled to perform heating in response to the existence of the first abnormal temperature data in the second temperature sensing region.

The second temperature sensing region may also be a region covered by all the temperature sensors, that is, the same as the first temperature sensing region, but the difference is that the time of measurement is different. The time to measure the temperature data is mostly when the display panel is placed in a high-cold and low-temperature environment. The temperature data acquired in the second temperature sensing region is compared with the reference temperature. For ease of description, the temperature data below the reference temperature is marked as first abnormal temperature data. If there is the first abnormal temperature data in the second temperature sensing region, that is, when there is temperature data below the reference temperature, the heating strips in the second temperature sensing region are controlled to heat the display panel, so as to ensure the normal operation of each module of the display panel. Compared with the starting of a heating program when the temperature is below the preset temperature, in the present embodiment, it is unnecessary to start the heating program only after the display panel reaches a particularly low temperature, which can reduce the operation time of the modules at low temperatures, reduce the loss of each module, and improve the response speed of each module.

Figure 9:
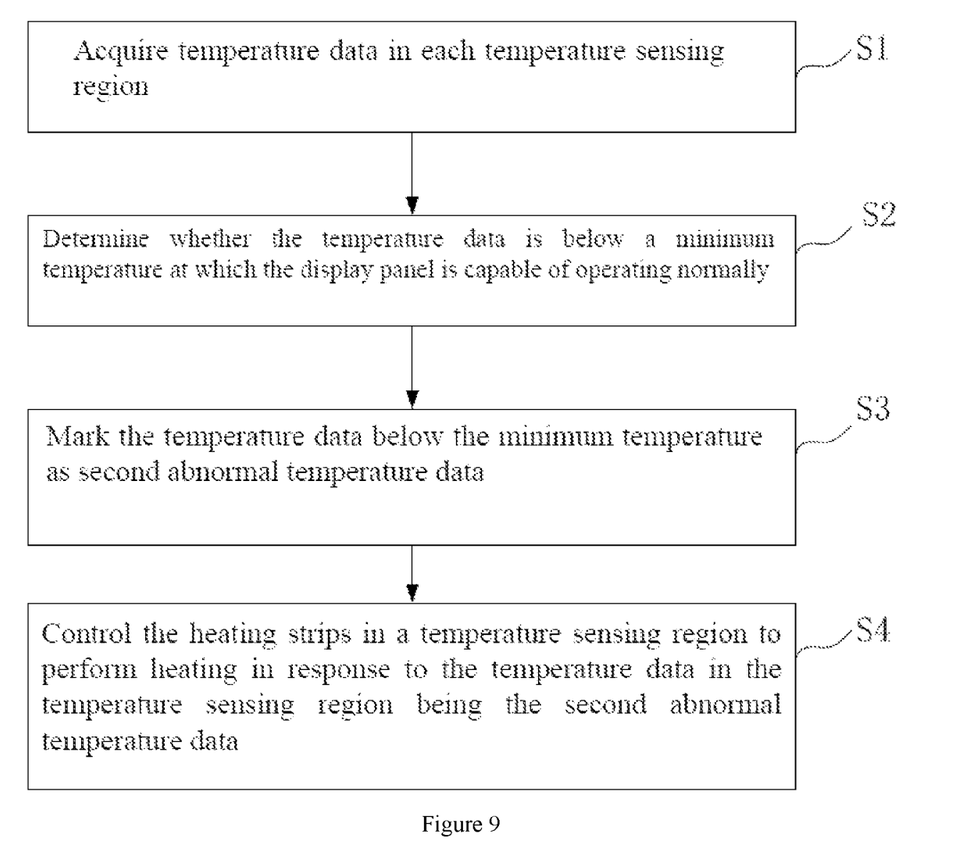
FIG. 9 is a schematic flow chart of a temperature compensation method of a display panel according to a further embodiment.

In one embodiment, each temperature sensing region includes one temperature sensor, and a preset number of heating strips are provided in each temperature sensing region; and the temperature compensation method of the display panel may further include steps S1 to S4.

In step S1, temperature data in each temperature sensing region is acquired.

In step S2, it is determined whether the temperature data is below a minimum temperature at which the display panel is capable of operating normally.

In step S3, the temperature data below the minimum temperature is marked as second abnormal temperature data.

In step S4, the heating strips in a temperature sensing region are controlled to perform heating in response to the temperature data in the temperature sensing region being the second abnormal temperature data.

Figure 5:
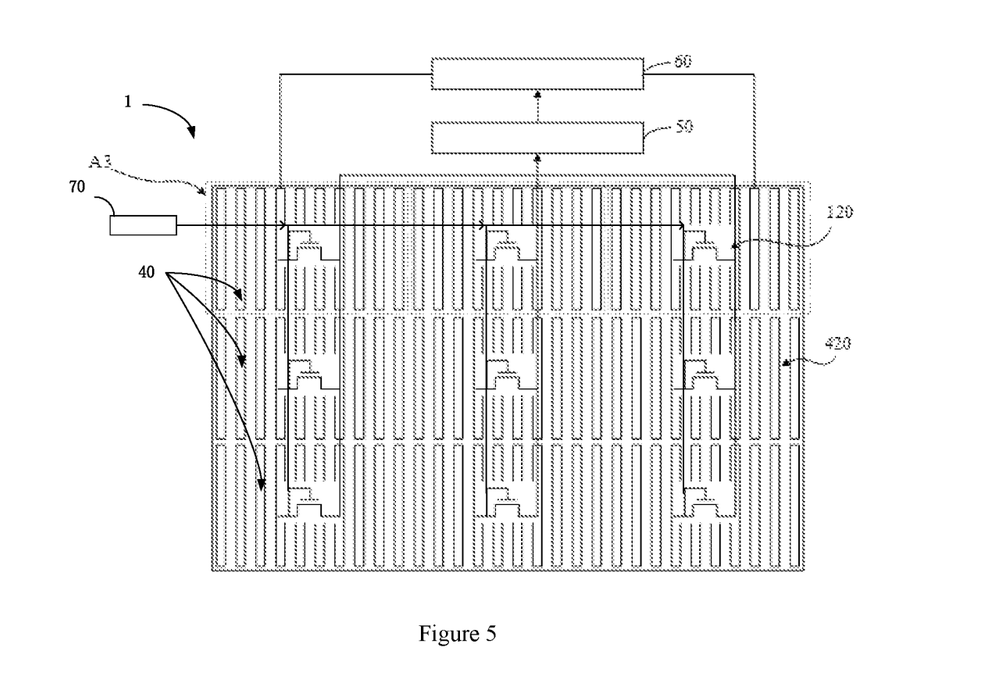
FIG. 5 is a schematic structural diagram of a display panel according to another embodiment.

Referring to FIG. 5 and FIG. 9 together, FIG. 5 is a schematic structural diagram of a display panel 1 according to an embodiment. FIG. 9 is a schematic flow chart of a temperature compensation method of a display panel according to a further embodiment. In FIG. 5, regions marked by A3 are the temperature sensing regions in the present embodiment. The entire display panel 1 is divided by a plurality of temperature sensing regions A3. Only one temperature sensor 120 is provided in each temperature sensing region A3, and the temperature sensing area A3 is also covered with a corresponding number of heating strips 420. Temperature data collected by the temperature sensor 120 in each temperature sensing region is acquired.

Different from the above embodiment, only one temperature sensor is provided in the temperature sensing region in the present embodiment, and a judgment mechanism for starting the heating program in the present embodiment is different. In the present embodiment, there is second abnormal temperature data. For ease of description, the temperature data below a minimum temperature at which the display panel is capable of operating normally is marked as second abnormal temperature data. The minimum temperature at which the display panel is capable of operating normally is different from both the reference temperature and the preset temperature described above. Generally, it is desired that each module of the display panel can operate at a temperature between −45° C. and 80° C., that is, the minimum temperature at which the display panel is capable of operating normally is generally −45° C. Therefore, in the embodiment of the present disclosure, −45° C. is taken as the minimum temperature at which the display panel is capable of operating normally. Temperature data in each temperature sensing region is collected, and the temperature data is compared with −45° C. If the temperature data in one temperature sensing region is the second abnormal temperature data, that is, when there is temperature data below −45° C., the heating strips in the temperature sensing region are controlled to heat the display panel, so as to ensure the normal operation of each module of the display panel. Compared with the starting of the heating program when the temperature is below the preset temperature or the reference temperature, in the present embodiment, the display panel can operate at a lower temperature and the applicability of the display panel is improved.

Figure 10:
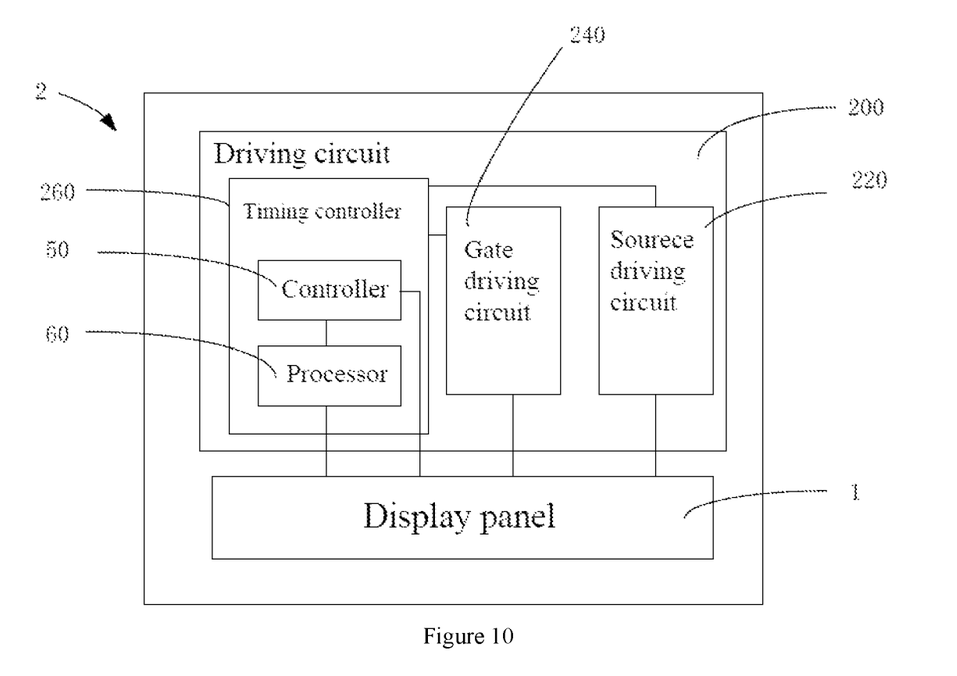
FIG. 10 is a schematic diagram of a display device according to an embodiment.

Based on the same invention concept, the present disclosure further provides a display device 2, as shown in FIG. 10. The display device 2 may include a driving circuit 200 and a display panel 1. The display panel 1 is any one of the display panels described above. The display device 2 may be, for example, a TFT-LCD display device, a curved display device or other display devices. The driving circuit 200 may include a source driving circuit 220, a gate driving circuit 240 and a timing controller 260. The timing controller 260 generates a clock signal which is used to control the source drive circuit 220 and the gate drive circuit 240. The gate drive circuit 240 outputs a scan signal under the control of the clock signal, so as to control pixel transistors in a display screen to switch on line by line. The source drive circuit 220 generates a voltage of a data signal input to pixels under the control of the clock signal. The timing controller 260 controls the matching of a scan frequency of the gate drive circuit 240 with a data refresh frequency of the source drive circuit 220. The processor 50 and the controller 60 in the above embodiments may be integrated in the timing controller 260 of the driving circuit 200. Since the display device 2 in the present embodiment includes the display panel 1 described above, the content of parts with the same beneficial effect can be obtained with reference to the description of the above embodiments and is not further repeated herein.

The technical features of the above embodiments may be arbitrarily combined. For the sake of brevity, all possible combinations of the technical features in the above embodiments are not described. However, if there is no contradiction in the combinations of the technical features, the combinations shall be considered to be within the scope of the specification.

The above embodiments represent only several implementations of the present disclosure, which are described more specifically and in detail, but are not to be construed as limiting the scope of the present disclosure. It should be noted that, for those of ordinary skill in the art, a number of transformations and improvements can also be made without departing from the conception of the present disclosure, and all these transformations and improvements fall within the protection scope of the present disclosure. Therefore, the protection scope of the present disclosure shall be subject to the appended claims.

The invention claimed is:

1. A display panel, comprising:
   a first substrate;
   a second substrate;
   a liquid crystal layer sandwiched between the first substrate and the second substrate;
   a plurality of temperature sensors disposed on the first substrate, wherein each temperature sensor comprises a source, a drain and a gate, and the drain and the gate of each temperature sensor are electrically connected; and the plurality of temperature sensors is configured to detect a temperature by detecting a resistance of the plurality of temperature sensors, and the resistance increases as the temperature decreases;
   a plurality of heaters respectively arranged on one side of the first substrate and the second substrate away from the liquid crystal layer;
   an electrical signal supply circuit configured to input an electrical signal to the drain of each temperature sensor;
   a processor connected to the source of each temperature sensor, and configured to determine whether temperature data acquired by each temperature sensor is below a preset temperature; and
   a controller connected to the processor and the plurality of heaters respectively, and configured to control the plurality of heaters to perform heating when the temperature data is below the preset temperature.

2. The display panel according to claim 1, wherein the plurality of temperature sensors are arranged in an array in the first substrate.

3. The display panel according to claim 2, wherein the temperature sensors in each row of the array forms a temperature sensing region.

4. The display panel according to claim 2, wherein the temperature sensors in each column of the array forms a temperature sensing region.

5. The display panel according to claim 1, wherein the plurality of heaters comprises a plurality of parallel heating strips made of a transparent conductive material.

6. The display panel according to claim 5, wherein the heating strips are connected in series or in parallel.

7. The display panel according to claim 5, wherein the heating strips in the same temperature sensing region are connected in series, and the heating strips in different temperature sensing regions are connected in parallel.

8. The display panel according to claim 5, wherein a preset number of heating strips are provided in each temperature sensing region.

9. The display panel according to claim 1, wherein the first substrate is a thin film transistor substrate, and the second substrate is a color filter substrate.

10. The display panel according to claim 1, wherein a via running through a gate insulation layer and an active layer is provided above the gate of the temperature sensor, and the drain is connected to the gate through the via.

11. The display panel according to claim 1, wherein each temperature sensor further comprises an active layer and a gate insulation layer between the gate and the active layer; when the temperature around the temperature sensor decreases, a binding between holes and electron pairs in the active layer slows down, and a concentration of a carrier also decreases, so that a current through the temperature sensor decreases, and the resistance increases; a plurality of temperature values under a plurality of different resistances are plotted in a two-dimensional coordinate system and points are connected by a curve, a curvilinear relationship between the temperature and the resistance is obtained, and thus the temperature around the temperature sensor is detected according to the curve by detecting the resistance.

12. The display panel according to claim 1, wherein the first substrate has a first surface and a second surface opposite to the first surface, the plurality of temperature sensors is located on the first surface, and some of the plurality of heaters are located on the second surface.

13. A temperature compensation method of a display panel, the display panel comprising:
a first substrate;
a second substrate;
a liquid crystal layer sandwiched between the first substrate and the second substrate;
a plurality of temperature sensors disposed on the first substrate, wherein each temperature sensor comprises a source, a drain and a gate, and the drain and the gate of each temperature sensor are electrically connected; and the plurality of temperature sensors is configured to detect a temperature by detecting a resistance of the plurality of temperature sensors, and the resistance increases as the temperature decreases;
a plurality of heaters respectively arranged on one side of the first substrate and the second substrate away from the liquid crystal layer;
an electrical signal supply circuit configured to input an electrical signal to the drain of each temperature' sensor;
a processor connected to the source of each temperature sensor, and configured to determine whether temperature data acquired by each temperature sensor is below a preset temperature; and
a controller connected to the processor and the plurality of heaters respectively, and configured to control the plurality of heaters to perform heating when the temperature data is below the preset temperature;
the method comprising:
acquiring temperature data collected by the temperature sensors at different positions of the display panel;
determining, by the processor, whether the temperature data is below the preset temperature; and
controlling, by the controller, the plurality of heaters to perform heating in response to the temperature data being below the preset temperature.

14. The temperature compensation method of the display panel according to claim 13, wherein the temperature sensors are divided into a plurality of temperature sensing regions in the display panel; and the method further comprises:
acquiring temperature data collected by the temperature sensors in a first temperature sensing region; and
acquiring an average value of the temperature data, and taking the average value as a reference temperature.

15. The temperature compensation method of the display panel according to claim 14, wherein the plurality of heaters comprises a plurality of parallel heating strips, and a preset number of heating strips are provided in each temperature sensing region; and the method further comprises:
acquiring temperature data collected by the temperature sensors in a second temperature sensing region;
determining whether the temperature data in the second temperature sensing region is below the reference temperature;
marking the temperature data below the reference temperature as first abnormal temperature data; and
controlling the heating strips in the second temperature sensing region to perform heating in response to the existence of the first abnormal temperature data in the second temperature sensing region.

16. The temperature compensation method of the display panel according to claim 13, wherein each temperature sensing region comprises one temperature sensor, and a preset number of heating strips are provided in each temperature sensing region; and the method further comprises:
acquiring temperature data in each temperature sensing region;
determining whether the temperature data is below a minimum temperature at which the display panel is capable of operating normally;
marking the temperature data below the minimum temperature as second abnormal temperature data; and
controlling the heating strips in the temperature sensing region to perform heating in response to the temperature data in the temperature sensing region being the second abnormal temperature data.

17. A display device, comprising a driving circuit and a display panel, wherein the display panel comprises:
a first substrate;
a second substrate;
a liquid crystal layer sandwiched between the first substrate and the second substrate;
a plurality of temperature sensors disposed on the first substrate, wherein each temperature sensor comprises a source, a drain and a gate, and the drain and the gate of each temperature sensor are electrically connected; and the plurality of temperature sensors is configured to detect a temperature by detecting a resistance of the plurality of temperature sensors, and the resistance increases as the temperature decreases;

a plurality of heaters respectively arranged on one side of the first substrate and the second substrate away from the liquid crystal layer;

an electrical signal supply circuit configured to input an electrical signal to the drain of each temperature sensor;

a processor connected to the source of each temperature sensor, and configured to determine whether temperature data acquired by each temperature sensor is below a preset temperature; and a controller connected to the processor and the plurality of heaters respectively, and configured to control the plurality of heaters to perform heating when the temperature data is below the preset temperature.

18. The display device according to claim 17, wherein the driving circuit comprises a source driving circuit, a gate driving circuit and a timing controller; wherein the timing controller is connected to the source driving circuit and the gate driving circuit respectively.

19. The display device according to claim 18, wherein the processor and the controller in the display panel are integrated in the timing controller of the driving circuit.

20. The display device according to claim 17, wherein each temperature sensor further comprises an active layer and a gate insulation layer between the gate and the active layer; when the temperature around the temperature sensor decreases, a binding between holes and electron pairs in the active layer slows down, and a concentration of a carrier also decreases, so that a current through the temperature sensor decreases, and the resistance increase; a plurality of temperature values under a plurality of different resistances are plotted in a two-dimensional coordinate system and points are connected by a curve, a curvilinear relationship between the temperature and the resistance is obtained, and thus the temperature around the temperature sensor is detected according to the curve by detecting the resistance.

* * * * *